United States Patent [19]

Nakata et al.

[11] E Patent Number: Re. 32,946

[45] Reissued Date of Patent: Jun. 13, 1989

[54] FISH BAIT TIER

[76] Inventors: Nori Nakata, 6 Van Allan Rd., Scarborough, Ontario, Canada, M1G 1C2; Joseph Melanson, 1 Haddon Street, Scarborough, Ontario, Canada, M1N 2K7

[21] Appl. No.: 105,137

[22] Filed: Jun. 13, 1989

Related U.S. Patent Documents

Reissue of:

[64] Patent No.: 4,555,893
Issued: Dec. 3, 1985
Appl. No.: 586,421
Filed: Mar. 5, 1984

[51] Int. Cl.[4] ..... B65B 11/02; B65B 47/04; B65B 51/10

[52] U.S. Cl. ..... 53/452; 53/463; 53/464; 53/479; 53/574; 53/390; 53/373

[58] Field of Search ..... 53/203, 219, 221, 390, 53/452, 463, 464, 558, 574, 578, 373, 479; 228/222

[56] References Cited

U.S. PATENT DOCUMENTS

| | | | |
|---|---|---|---|
| 528,899 | 11/1894 | Barnewitz | 53/464 X |
| 1,497,276 | 6/1924 | Hirschhorn | 53/464 X |
| 1,894,346 | 1/1933 | Cooper | 53/464 X |
| 2,165,840 | 7/1939 | Doble | 53/464 X |
| 2,783,599 | 3/1957 | Weikert | 53/479 X |
| 3,175,338 | 3/1965 | Ahlgren et al. | 53/390 |
| 3,245,198 | 4/1966 | Schmied | 53/464 |
| 3,438,173 | 4/1969 | Omori | 53/373 X |
| 3,550,353 | 12/1970 | Haadsma | 53/390 |
| 3,552,630 | 1/1971 | Dean | 228/222 X |
| 3,696,585 | 10/1972 | Ritter | 53/390 |
| 3,910,807 | 10/1975 | Heinzer | 53/479 X |

FOREIGN PATENT DOCUMENTS

| | | | |
|---|---|---|---|
| 1243084 | 6/1967 | Fed. Rep. of Germany | 53/221 |

*Primary Examiner*—John Sipos
*Attorney, Agent, or Firm*—Shlesinger, Fitzsimmons & Shlesinger

[57] ABSTRACT

A device is provided for enclosing fish bait in a permeable mesh bag using a base with a well therein into which the central portion of such mesh may be depressed and wherein the bait may be placed in the mesh. A pair of metal plates are provided which act to close over the bait the mesh protruding from the well.

19 Claims, 2 Drawing Sheets

FISH BAIT TIER

Figure 1:
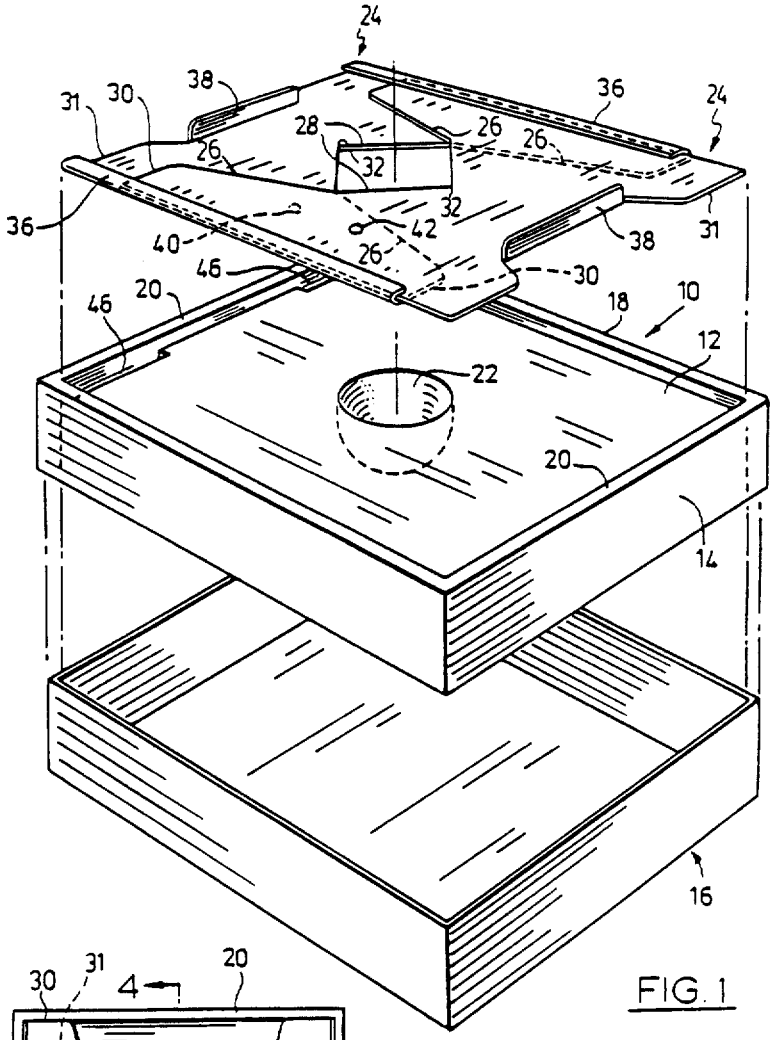

Matter enclosed in heavy brackets [ ] appears in the original patent but forms no part of this reissue specification; matter printed in italics indicates the additions made by reissue.

This invention relates to a device for tying or heat sealing bait and in particular salmon eggs in open mesh bags.

Some bait, and salmon eggs are a particular example in this category, is not sufficiently coherent and self supporting to be attached of itself to a fishing line or hook. Accordingly, such bait must be tied or sealed in an open mesh bag (usually of plastic) so that the bag may be attached to the hook or line.

Prior patents providing devices to assist in tying bait in open mesh bags include U.S. Pat. Nos. 3,889,453: Hirai, 4,002,006; Bruno, 3,550,353; Haadama, 3,696,585; Ritter, 3,175,338; Ahlgren.

This is the closest prior art to the present invention, known to us. The prior art patents show various means for clamping an open mesh bag about some bait for tying. None of such patents shows the provision of a well for supporting and shaping the wire mesh bag during clamping and tying. None of such patents shows provision for heat sealing closed an open mesh plastic bag instead of tying it and in particular does not show clamping plates of metal designed to act as a heat sink. (Haadama shows metal wires as the clamping means but which insufficient metal to act as a heat sink). The patents further fail to show other features of the invention as specifically described herein.

It is an object of this invention to provide a device for clamping and tying or sealing bags of open mesh material about bait wherein the device provides a well for supporting and shaping said bag during clamping and tying or sealing.

It is an object of this invention to provide a device for clamping and tying or sealing bags of open mesh material about bait wherein the clamping is performed by two side-by-side metal plates which define an open aperture in one position so that the open mesh may be filled with said bait below said aperture with the mesh extending therethrough, wherein the plates may then be moved to closed position clamping the mesh therebetween for sealing or tying.

Figure 2:
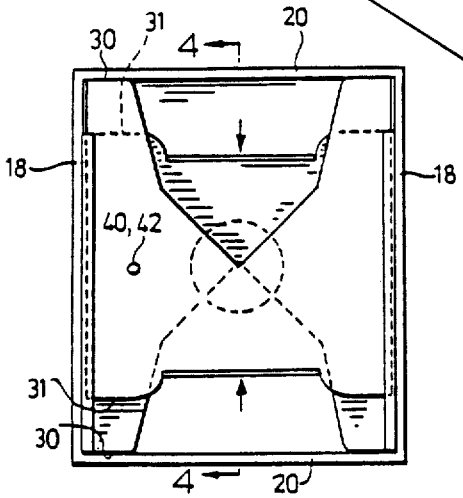
Figure 3:
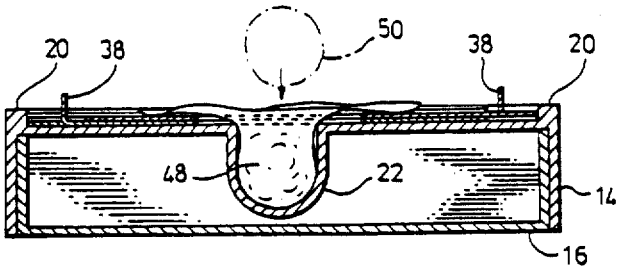
Figure 4:
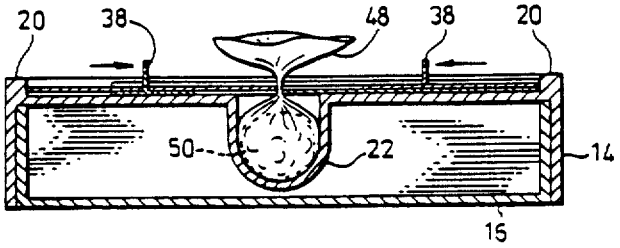
Figure 5:
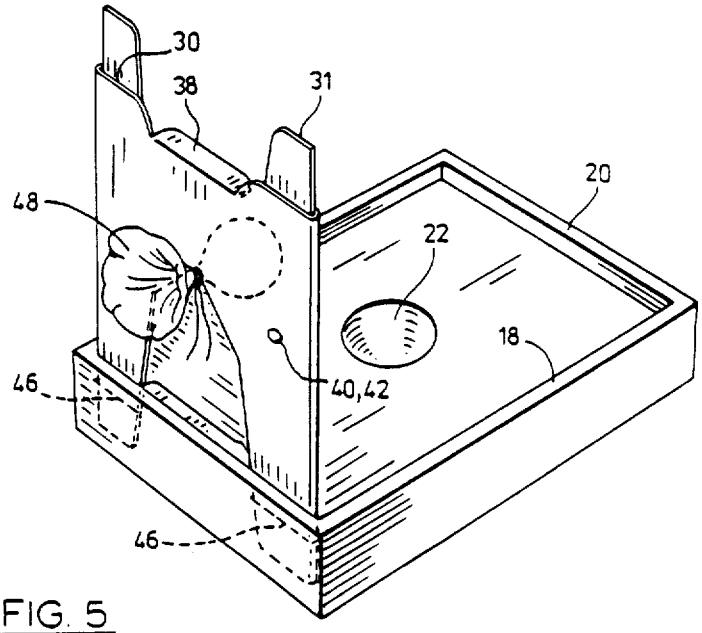

In the drawings which illustrate a preferred embodiment of the invention:

FIG. 1 is an exploded perspective view of a device in accord with the invention and showing the clamping metal plates in open position, FIG. 2 shows a top view of the device with the clamping metal plates in closed position, FIG. 3 is a sectional view taken on a plane parallel to the relative sliding direction of the clamping plates with the plates in open position, FIG. 4 is a sectional view corresponding to FIG. 3, taken on the line 4—4 of FIG. 3 and with the plates in closed position, FIG. 5 shows the device used for tying the bait.

In the drawings a base 10, rectangular in plan view, provides an upper horizontal surface 12 with vertically downwardly depending walls 14 on each side to support said surface 12 at predetermined height above a support surface. Although it is not essential to the invention described it is noted that a open topped rectangular container 16 may be provided dimensioned to be slidably received within the walls 14.

Surface 12 on its long sides is provided with upraised boundary ridges 18, which act as sideways motion limiting members as hereinafter described; and surface 12 on its short sides is provided with upraised boundary ridges 20 adjacent the end edges of surface 12, which act as endwise motion limiting members as hereinafter described.

Surface 12 is provided with material 22 defining an upwardly opening well extending downwardly from the surface. The material defining this well is dimensioned to define the diameter and depth and hence the shaping of the open mesh bag to contain the bait. The well is centrally located between the side ridges and the end ridges. Rectangular member 10 having components as described is preferably made from molded plastic. Rectangular container 16 is similarly made of molded plastic.

A pair of metal plates 24 are provided in side-by-side arrangement. Each plate has parallel side edges and is provided with end edges 30 and 31 perpendicular to the sides. End edge 30 is cut out to define a mouth defined by edges 26 converging as they progress inwardly from the edge 30 of the end edge and converging at the point 32 midway between the side edges. The plates 24 are each designed, as hereinafter described, to slide within the side ridges 18. Each plate 24 is dimensioned longitudinally so that when the end edge 31 of the plate is resting against its nearer end ridge 20 the converging edges 28 of the two plates together are retracted to expose and approximately frame the opening of well 22. Each plate 24 is further dimensioned longitudinally so that with the end edge 30 resting against its nearer end ridges 20 the point of convergence 32 of the two plates 24 substantially coincide with each other and with the center of well 22. One of the plates 24 is provided with side flanges 36 designed to extend outwardly beyond the side edges of the other plate to be folded back over and slidably receive said other plate. Thus the two plates may be assembled as shown in the drawings and slidable between open and closed positions. The side ridges 18 of base are spaced to receive the side flanges 36 therebetween. When the plates 24 are located on the housing, they may be moved so that the end edges 31 are at their widest spacing relative to one another and resting against their nearer ridges 20. This is the open position of the metal plates and the mutually facing converging edges 28 define a diamond shaped or square aperture of approximately the size of the well 22 and aligned therewith. The side and end ridges 18 and 20 and the dimensioning of the plates 24 is defined to provide such alignment. The plates may be moved toward each other until the end edge 30 meets its nearer end ridge 20 and since the convergence points 32 of the edge 28 is designed to be substantially at the center of the member 12 at this point the two sets of converging edges 28 substantially close the aperture over the well 22 in this position.

A short tab of material 38 central to the uninterrupted edge is preferably raised on each plates to provide means for manual grasping to assist in movement of plates.

Means, for a purpose to be hereinafter described are provided for releasably retaining the plates in their closed position (i.e. the position of FIGS. 2 and 4) relative to each other. This may be provided in any desired manner but we prefer to provide it by providing a dimple 40 in lower plate 24 located to receive a detent 42 in the upper plate 24 when the plates 24 are in their closed position. This will retain the plates 24 in closed position, but when it is desired to move the plates to open position extra pressure or a slight spreading of the plates will release the detent 42 from the dimple 40 and allow such opening movement of the plates. Metal plates 24 are designed to act as a heat sink or heat radiator to disperse heat provided by a match, cigarette or soldering iron as hereinafter described and thus to protect the plastic mesh below the plates from excess heat.

It is noted that in the closed position of plates 24 two projecting extents are provided in either of the plates, such extents ending at edges. At one end of the housing two slots 46 in surface 12 are provided to receive such projections so that the projections may be placed therein and the closed plates stood vertically on the base as shown in FIG. 5. The side ridges 18 are made thick enough that the side flanges of plate 36 may on the one hand slide snugly therein and, on the other hand, the plates 24 together may be stored in the open container 16 when not in use.

The open mesh 48 used is preferably nylon (and must be of plastic if heat sealing is used). The mesh 48 is loose enough to admit water to the bait, in use, and fine enough to retain the bait.

In use, the plates 24 are placed inside the side and end ridges 18 and 20 and moved to open position (FIGS. 1 and 3). Open mesh 48 is inserted through the aperture in the plates and to the bottom of the well with the finger. Bait 50 usually salmon eggs is inserted in a quantity to remain below the upper surface 12 of base 10. The plates 24 are then moved to closed position (see FIGS. 2 and 4), using tabs 38 clamping the mesh 48 over the bait. Two alternative methods of closing the bag are available. If heat sealing is to be used then the closed plates clamping the bag are left in place, a hot article (e.g. soldering iron, cigarette or match) is then applied to the mesh just above plates 24 effectively sealing it about the bait and providing a close bag for use. Excess material is simply burnt off by the operation. It will be noted that the heat conduction and radiation qualities of metal plates 24 prevent damage by the applied heat to the plastic member 10 or to the mesh 48 below the plates. If the clamped material is to be tied instead of heat sealed then the plates clamping the material about the mesh are removed and inserted in the slots 46 to stand upright. The mesh is then tied just below the clamped plate, the plate 24 are then opened and the bag removed.

On either method of sealing the bag is removed and the plates placed on surface 12 for further use.

It will be seen, with the invention as demonstrated in the specific embodiment that a convenient pocket-sized device may be provided in accord with the invention.

Although not shown the invention also extends to the provision of a pair of metal plates, operable on a base as before described where the metal plates are movable between two limiting positions and, in one limiting position to define a series of jointly framed apertures. A corresponding series of wells as described are provided in the base aligned with the plate-defined apertures. The plates are movable to the other limiting position where they close the plate defined apertures over the wells. In this way a plurality of mesh bags, corresponding to the number of wells and plate-defined apertures, may be tied in each cyclical operation of the plates.

I claim:

1. Device for enclosing fish bait comprising:

a base means defining an upwardly opening well having sides and bottom in said base dimensioned to receive nylon mesh and some bait therein, a pair of horizontally arranged metal plates and means mounting each said plate for movement to enable said plates to slide in a horizontal relative longitudinal sliding direction over one another in side by side relationship, said plates being designed to slide relative to each other in said sliding direction between an open and a closed limiting position, wherein, in said open position, said plates are shaped together to define an aperture aligned with said well, and in said closed position said plates substantially close said aperture over said well.

2. Device as claimed in claim 1 wherein each plate defines diverging edges facing the direction of movement of the plate toward closed position, and said aperture is defined by said diverging edges, whereby movement of the plates relative to each other toward closed position causes the aperture defined by the two sets of diverging edges to decrease the size.

3. Device as claimed in claim 2 wherein upstanding ridges on each side of said base provide side guides to limit lateral movement of said plates relative to said aperture.

4. Device as claimed in claim 2 wherein end stops are provided on said base, limiting movement of said plates relative to said base in said relative sliding direction, whereby in open position each plate is resting against a stop with the aperture aligned with said well and in closed position each plate is resting against the other stop with material clamped in said substantially closed aperture located over said well.

5. Device as claimed in claim 1 wherein said plates are provided with mutually interacting releasable detent means for releasably retaining said plates in closed postion.

6. Device as claimed in claim 5 wherein upstanding ridges on each side of said base provide side guides to limit lateral movement of said plates relative to said aperture.

7. Device as claimed in claim 5 wherein end stops are provided on said base, limiting movement of said plates relative to said base in said relative sliding direction, whereby in open position each plate is resting against a stop with the aperture aligned with said well and in closed position each plate is resting against the other stop with material clamped in said substantially closed aperture located over said well.

8. Device as claimed in claim 1 wherein said plates are provided with mutually interacting releasable detent means for releasably retaining said plates in closed position.

9. Device as claimed in claim 8 wherein upstanding ridges on each side of said base provide side guides to limit lateral movement of said plates relative to said aperture.

10. Device as claimed in claim 8 wherein end stops are provided on said base, limiting movement of said plates relative to said base in said relative sliding direction, whereby in open position each plate is resting against a stop with the aperture aligned with said well and in closed position each plate is resting against the other stop with material clamped in said substantially closed aperture located over said well.

11. Device as claimed in claim 1 wherein each of said plates is provided with side edges substantially parallel to the relative sliding direction and said mounting means comprising providing one of said plates with opposed side flanges bent back over said plate to define a mutually facing grooves which slidably receive the other said plate and guide its relative movements.

12. Device as claimed in claim 11 wherein end stops are provided on said base, limiting movement of said plates relative to said base in said relative sliding direction, whereby in open position each plate is resting against a stop with the aperture aligned with said well and in closed position each plate is resting against the other stop with material clamped in said substantially closed aperture located over said well.

13. Device as claimed in claim 11 wherein upstanding ridges on each side of said base provide side guides to limit lateral movement of said plates relative to said aperture.

14. Device as claimed in claim 1 wherein upstanding ridges on each side of said base provide side guides to limit lateral movement of said plates relative to said aperture.

15. Device as claimed in claim 1 wherein end stops are provided on said base, limiting movement of said plates relative to said base in said relative sliding direction, whereby in open position each plate is resting against a stop with the aperture aligned with said well and in closed position each plate is resting against the other stop with material clamped in said substantially closed aperture located over said well.

*16. A method of heat sealing bait in a thermoplastic mesh bag, comprising*

*partially filling a thermoplastic mesh bag with fish bait,*

*placing the closed end of the bag containing the bait in a large recess in a housing,*

*temporarily gripping the bag adjacent its open end, and outwardly of said recess, between the converging edges of two metal plates which are mounted on the housing to slide into and out of closed positions in which they overlie and substantially close off the open end of said recess, and in which positions said converging edges of the plates surround and releasably hold said bag closed adjacent to but inwardly of its open end, and*

*temporarily applying sufficient heat to said bag at the side of said plates remote from said recess to cause the open end of said bag to be heat sealed closed.*

*17. Device for use in enclosing and heat sealing bait in a thermoplastic mesh bag, comprising*

*a base,*

*means on said base defining a well having an open end and dimensioned to receive the closed end of a thermoplastic mesh bag containing fish bait, and*

*heat sink means on said base comprising a pair of metal plates mounted on said base with substantial portions thereof disposed in overlapping relation, one of said plates being movable relative to the other and selectively into and out of a closed position in which recessed edge portions of said plates overlie and substantially close the open end of said well,*

*said recessed edge portions of said metal plates having thereon confronting, converging edges operative, when the closed end of said bag is in said well and the open end of the well is closed by said plates, to surround and releasably to hold said bag closed adjacent to and inwardly of its open end, and*

*said overlapping portions of said plates having substantial surface areas thereof disposed in substantially coplanar engagement with each other when said one plate is in its closed position, whereby when the bag is heat sealed closed by applying heat to a portion of said bag that projects beyond the sides of said plates remote from said well, said plates disperse by conduction and radiation heat which might otherwise damage that portion of the bag located within said well.*

*18. Device as contained in claim 17, including*

*means interconnecting said plates for sliding movement relative to one another in adjacent, parallel planes, and*

*means removably supporting the interconnected plates on said base for movement selectively, and as a unit, onto or off of said base.*

*19. Device as claimed in claim 17, wherein*

*said plates have registering, longitudinally extending side edges slidably connected to each other,*

*said recessed edge portions are formed in a pair of overlapping ends of said plates, and*

*a transverse lip is formed on the opposite end of each plate for use in shifting said plates relative to each other.*

* * * * *